United States Patent
Naik Raikar (10) Patent No.: US 9,749,689 B2
(45) Date of Patent: Aug. 29, 2017

(54) INTELLIGENT RECORDING OF FAVORITE VIDEO CONTENT USING A VIDEO SERVICES RECEIVER

(71) Applicant: SLING MEDIA PVT LTD, Bangalore (IN)

(72) Inventor: Yatish Jayant Naik Raikar, Bangalore (IN)

(73) Assignee: Sling Media PVT Ltd., Bangalore, IN (US)

(*) Notice: Subject to any disclaimer, the term of this patent is extended or adjusted under 35 U.S.C. 154(b) by 0 days.

(21) Appl. No.: 15/250,599

(22) Filed: Aug. 29, 2016

(65) Prior Publication Data
US 2016/0381417 A1     Dec. 29, 2016

Related U.S. Application Data

(62) Division of application No. 14/043,053, filed on Oct. 1, 2013, now abandoned.

(51) Int. Cl.
*H04N 21/442* (2011.01)
*H04N 21/433* (2011.01)
(Continued)

(52) U.S. Cl.
CPC ... *H04N 21/44222* (2013.01); *H04N 21/4147* (2013.01); *H04N 21/4334* (2013.01);
(Continued)

(58) Field of Classification Search
None
See application file for complete search history.

(56) References Cited

U.S. PATENT DOCUMENTS

| | | | | |
|---|---|---|---|---|
| 5,734,444 A | * | 3/1998 | Yoshinobu | H04N 5/44 348/734 |
| 2003/0152247 A1 | | 8/2003 | Okajima et al. | |

(Continued)

FOREIGN PATENT DOCUMENTS

| | | |
|---|---|---|
| WO | 9904561 A1 | 1/1999 |
| WO | 2008016611 A2 | 2/2008 |
| WO | 2013001328 A2 | 1/2013 |

OTHER PUBLICATIONS

European Patent Office International Searching Authority, "International Search Report and Written Opinion" mailed Dec. 5, 2014 for International Application No. PCT/US2014/057835.

(Continued)

*Primary Examiner* — Omar S Parra
(74) *Attorney, Agent, or Firm* — LK Global (57) ABSTRACT

A video services receiver and related operating methods are presented here. The video services receiver is configured to maintain a database that indicates a viewing pattern for a user of the video services receiver. The video services receiver is configured to detect a condition that is inconsistent with the maintained viewing pattern for the user. In response to the detection of an inconsistent condition, the video services receiver records a designated program event included in the viewing pattern for the user, wherein the recording addresses the detected condition. In some scenarios, the receiver buffers the designated program event to allow the user to view the entirety of the buffered program event. In other scenarios, the receiver records the designated program event and sends a notification to the user when the receiver determines that the user is absent or is not viewing any programming from the receiver.

6 Claims, 5 Drawing Sheets

(51) Int. Cl.
    *H04N 21/472*     (2011.01)
    *H04N 21/45*     (2011.01)
    *H04N 21/458*     (2011.01)
    *H04N 21/4147*     (2011.01)
    *H04N 21/466*     (2011.01)

(52) U.S. Cl.
    CPC ..... *H04N 21/4532* (2013.01); *H04N 21/4583* (2013.01); *H04N 21/4668* (2013.01); *H04N 21/47217* (2013.01)

(56) References Cited

U.S. PATENT DOCUMENTS

| | | |
|---|---|---|
| 2008/0124046 A1 | 5/2008 | Hiramatsu et al. |
| 2010/0296797 A1 | 11/2010 | Thijssen |
| 2013/0097623 A1 | 4/2013 | Lai et al. |
| 2013/0216207 A1 | 8/2013 | Berry et al. |
| 2014/0189721 A1 | 7/2014 | Zaveri |

OTHER PUBLICATIONS

USPTO Non-Final Office Action, U.S. Appl. No. 14/043,053, Dated Apr. 23, 2015.
USPTO Final Office Action, U.S. Appl. No. 14/043,053, Dated Aug. 21, 2015.
USPTO Non-Final Office Action, U.S. Appl. No. 14/043,053, Dated Nov. 25, 2015.
USPTO Final Office Action, U.S. Appl. No. 14/043,053, Dated Apr. 8, 2016.

* cited by examiner

INTELLIGENT RECORDING OF FAVORITE VIDEO CONTENT USING A VIDEO SERVICES RECEIVER

CROSS-REFERENCE TO RELATED APPLICATION

This application is a divisional of U.S. patent application Ser. No. 14/043,053, filed Oct. 1, 2013, now abandoned.

TECHNICAL FIELD

Embodiments of the subject matter described herein relate generally to video services systems. More particularly, embodiments of the subject matter relate to systems and methods for automatically recording or buffering video programming for a user.

BACKGROUND

Most television viewers now receive their video signals through a content aggregator such as a cable or satellite television provider. Digital video broadcasting (DVB) systems, such as satellite systems, are generally known. A DVB system that delivers video service to a home will usually include a video services receiver, system, or device, which is commonly known as a set-top box (STB). In the typical instance, encoded television signals are sent via a cable or wireless data link to the viewer's home, where the signals are ultimately decoded in the STB. The decoded signals can then be viewed on a television or other appropriate display as desired by the viewer.

A practical implementation of an STB may include or cooperate with a digital video recorder (DVR), a time shift buffer, and/or any convenient recording function that is designed to record video, audio, and/or audiovisual programs received by the STB. The user can then play recorded programs at any convenient time. Moreover, a conventional STB can generate a menu or listing of recorded programs for graphical rendering on a display device, such as a television or a monitor. The user can navigate an onscreen listing of recorded programs to identify or select a program for playback, to delete recorded content, etc.

Although modern STBs allow users to schedule the recording of program events (such as favorite broadcast programs), a given user may forget to schedule a recording or may have reasons to not schedule the recording of all favorite content. In certain situations, a user may be watching a different channel or a live sporting event that runs into overtime, such that the user misses the beginning of a favorite program. If recording of that program has not been scheduled, then the user will be inconvenienced. There may be other situations where one or more favorite program events could be missed (if recording has not been previously configured).

Accordingly, it is desirable to have a methodology for automatically determining that a user might be missing the beginning of a favorite program and, in response to the determination, automatically initiating the recording or buffering of the favorite program. Furthermore, other desirable features and characteristics will become apparent from the subsequent detailed description and the appended claims, taken in conjunction with the accompanying drawings and the foregoing technical field and background.

BRIEF SUMMARY

An exemplary embodiment of a method of operating a video services receiver maintains a database at the video services receiver, wherein the database indicates a viewing pattern for a user of the video services receiver. The method detects a condition that is inconsistent with the maintained viewing pattern for the user and, in response to the detecting, records a designated program event included in the viewing pattern for the user, wherein the recording addresses the detected condition.

An exemplary embodiment of a video services receiver is also presented here. The video services receiver handles recorded and non-recorded content for a user. The video services receiver includes a receiver interface to receive data associated with video services, a recording module coupled to the receiver interface to record program events provided by the video services, at least one data storage element coupled to the recording module to store recorded content for the recording module, and a display interface for a display operatively coupled to the video services receiver. The display interface facilitates presentation of recorded and non-recorded program events on the display. The video services receiver also includes a processor coupled to the receiver interface, the recording module, the at least one data storage element, and the display interface. The processor detects a condition that is inconsistent with a maintained viewing pattern for a user of the video services receiver, and, in response to the detected condition, activates the recording module to record a designated program event included in the maintained viewing pattern.

Another embodiment of a method of operating a video services receiver is also presented here. The method maintains, at the video services receiver, a database that indicates a favorite program event having a scheduled start time. The method continues by detecting that the video services receiver is currently tuned to an ongoing program event that conflicts with the scheduled start time of the favorite program event. In response to the detecting, the method automatically records the favorite program event at a time that is no later than the scheduled start time of the favorite program event.

Yet another method of operating a video services receiver is presented here. The video services receiver has an associated display element configured to display content provided by the video services receiver. This particular embodiment of the method maintains, at the video services receiver, a database that indicates a favorite program event having a scheduled start time. The method continues by detecting that the video services receiver is currently in a receiver standby mode, that the display element is currently in a display standby mode, or that the video services receiver is currently in the receiver standby mode and the display element is currently in the display standby mode. In response to the detecting, the method automatically records the favorite program event at a time that is no later than the scheduled start time of the favorite program event.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The exemplary embodiments described below relate to a video delivery system such as a satellite television system, a cable delivery system, an Internet-based content delivery system, or the like. The disclosed subject matter relates to a recording function of a video services receiver (e.g., a STB, a mobile device with video presentation and recording functionality, a suitably configured computing device, or the like). More specifically, the disclosed subject matter relates to an automated technique for buffering and/or recording favorite video program content on behalf of a user. The automatic buffering/recording occurs when the STB determines that there is some type of user viewing conflict that might prevent the user from viewing some or all of the favorite program. For example, if the user is watching a football game that has gone into overtime (on a first channel), the STB automatically buffers or records one of the user's favorite programs (assuming that the favorite program started before the end of the football game). As another example, if the STB or the user's display device is in a standby mode at the start time of a favorite program, then the STB automatically records the favorite program.

Figure 1:
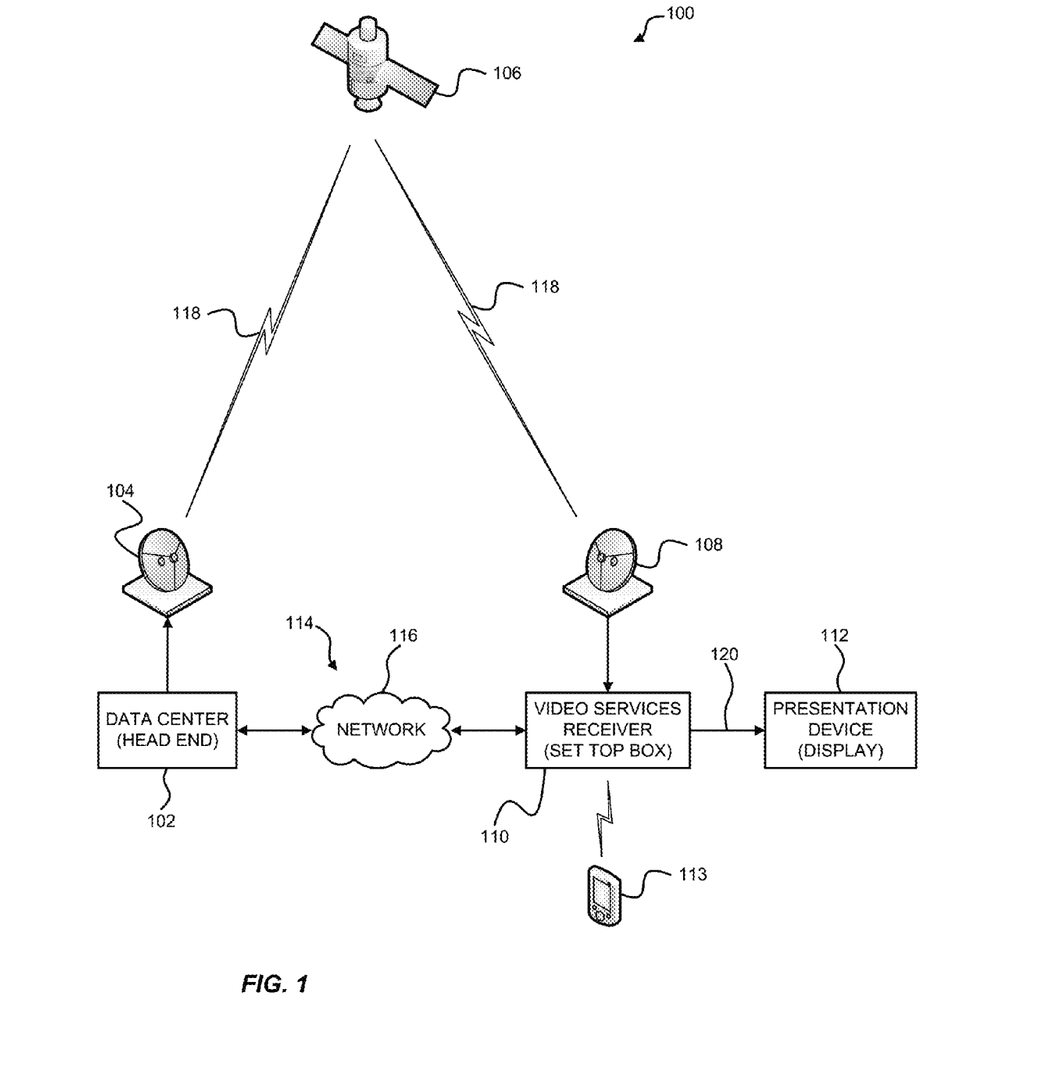
FIG. 1 is a schematic representation of an embodiment of a video services broadcasting system.

Turning now to the drawings, FIG. 1 is a schematic representation of an embodiment of a video services broadcasting system 100 that is suitably configured to support the techniques and methodologies described in more detail below. The system 100 (which has been simplified for purposes of illustration) generally includes, without limitation: a data center 102; an uplink transmit antenna 104; a satellite 106; a downlink receive antenna 108; a video services receiver 110 or other customer equipment; and a presentation device, such as a display element 112. In typical deployments, the video services receiver 110 can be remotely controlled using a wireless remote control device 113. In certain embodiments, the data center 102 communicates with the video services receiver 110 via a back-channel connection 114, which may be established through one or more data communication networks 116. For the sake of brevity, conventional techniques related to satellite communication systems, satellite broadcasting systems, DVB systems, data transmission, signaling, network control, and other functional aspects of the systems (and the individual operating components of the systems) may not be described in detail herein.

The data center 102 may be deployed as a headend facility and/or a satellite uplink facility for the system 100. The data center 102 generally functions to control content, signaling data, programming information, and other data sent over a high-bandwidth link 118 to any number of downlink receive components (only one downlink receive antenna 108, corresponding to one customer, is shown in FIG. 1). In practice, the data center 102 also provides content and data that can be used to populate an interactive electronic program guide (EPG) generated by the video services receiver 110. In the embodiment shown in FIG. 1, the high-bandwidth link 118 is a direct broadcast satellite (DBS) link that is relayed by the satellite 106, although equivalent embodiments could implement the high-bandwidth link 118 as any sort of cable, terrestrial wireless and/or other communication link as desired.

The data center 102 includes one or more conventional data processing systems or architectures that are capable of producing signals that are transmitted via the high-bandwidth link 118. In various embodiments, the data center 102 represents a satellite or other content distribution center having: a data control system for controlling content, signaling information, blackout information, programming information, and other data; and an uplink control system for transmitting content, signaling information, blackout information, programming information, and other data using the high-bandwidth link 118. These systems may be geographically, physically and/or logically arranged in any manner, with data control and uplink control being combined or separated as desired.

The uplink control system used by system 100 is any sort of data processing and/or control system that is able to direct the transmission of data on the high-bandwidth link 118 in any manner In the exemplary embodiment illustrated in FIG. 1, the uplink transmit antenna 104 is able to transmit data to the satellite 106, which in turn uses any number of appropriately configured transponders for repeated transmission to the downlink receive antenna 108.

Under normal operating conditions, the satellite 106 transmits content, signaling data, blackout information, EPG data, and other data to the downlink receive antenna 108, using the high-bandwidth link 118. In practical embodiments, the downlink receive antenna 108 represents the customer's satellite dish, which is coupled to the video services receiver 110. The video services receiver 110 can be realized as any device, system or logic capable of receiving signals via the high-bandwidth link 118 and the downlink receive antenna 108, and capable of providing demodulated content to a customer via the display element 112.

The display element 112 may be, without limitation: a television set; a monitor; a computer display; or any suitable customer appliance with compatible display capabilities. In various embodiments, the video services receiver 110 is implemented as a set-top box (STB) as commonly used with DBS or cable television distribution systems. In other embodiments, however, the functionality of the video services receiver 110 may be commonly housed within the display element 112 itself. In still other embodiments, the video services receiver 110 is a portable device that may be transportable with or without the display element 112. The video services receiver 110 may also be suitably configured to support broadcast television reception, video game playing, personal video recording and/or other features as desired.

During typical operation, the video services receiver 110 receives programming (broadcast events), signaling information, and/or other data via the high-bandwidth link 118. The video services receiver 110 then demodulates, decompresses, descrambles, and/or otherwise processes the received digital data, and then converts the received data to suitably formatted video signals 120 that can be rendered for viewing by the customer on the display element 112. The video services receiver 110 may also be capable of receiving web-based content via the network 116, the Internet, etc. Additional features and functions of the video services receiver 110 are described below with reference to FIG. 2.

The system 100 includes one or more speakers, transducers, or other sound generating elements or devices that are utilized for playback of sounds during operation of the system 100. These sounds may be, without limitation: the audio portion of a video channel or program; the content associated with an audio-only channel or program; audio related to the navigation of the graphical programming guide; confirmation tones generated during operation of the system; alerts or alarm tones; or the like. Depending upon the embodiment, the system 100 may include a speaker (or a plurality of speakers) attached to, incorporated into, or otherwise associated with the display device, the video services receiver 110, the remote control device 113, and/or a home theater, stereo, or other entertainment system provided separately from the system 100.

The video services receiver 110 can be operated in a traditional manner to receive, decode, and present a first video program event as the primary video content (i.e., a show that the user is currently watching). Moreover, the video services receiver 110 can be operated to receive and buffer or record one or more other video program events (i.e., a favorite show that the user is not currently watching). In certain implementations, the video services receiver 110 includes multiple tuners to enable it to concurrently receive and process the primary video content and one or more additional video program events for purposes of buffering or recording in the manner described in more detail herein.

Although not separately depicted in FIG. 1, the video services receiver 110 may include video place-shifting functionality or it may cooperate with a suitably configured place-shifting device or component to place-shift video content that is received by the video services receiver 110. In this regard, it may be possible to provide live or recorded content to a remote device operated by the user, wherein the video services receiver 110 serves as a source of the place-shifted content.

Figure 2:
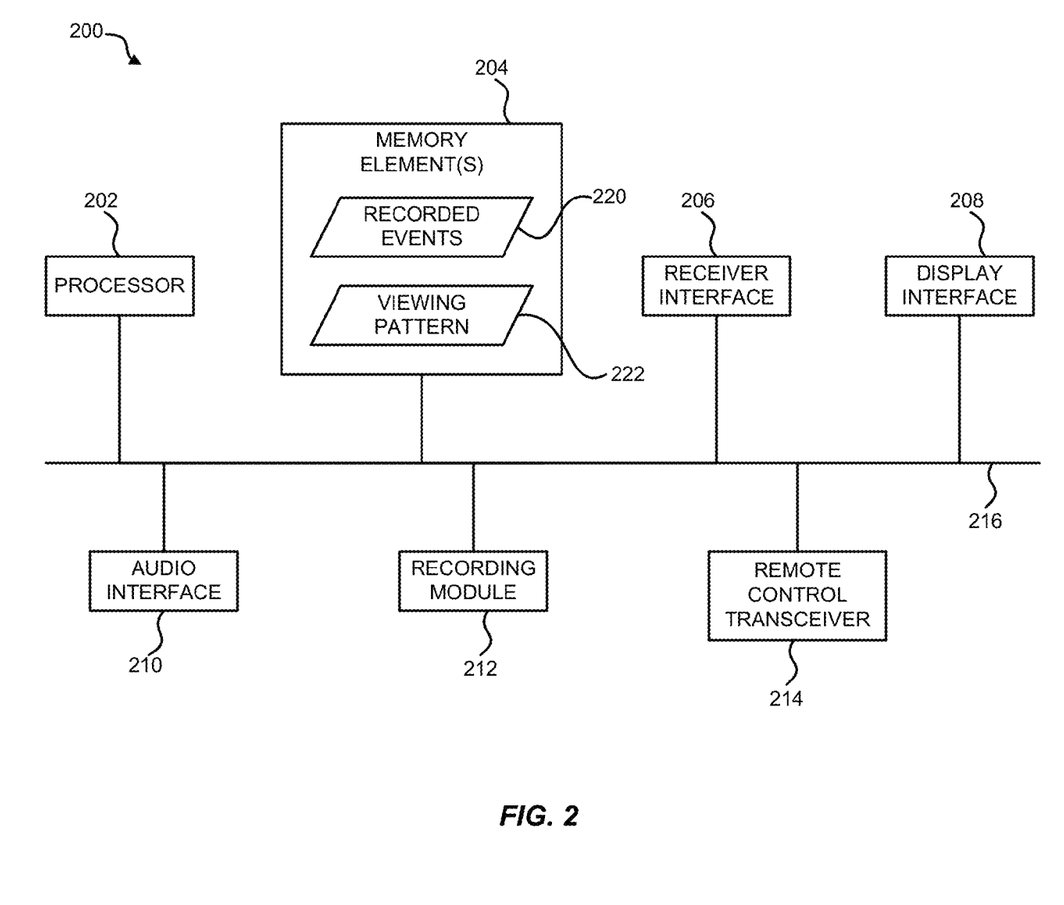
FIG. 2 is a schematic representation of an embodiment of a video services receiver suitable for use in the video services broadcasting system shown in FIG. 1.

FIG. 2 is a schematic representation of an embodiment of a video services receiver 200 suitable for use in the video services broadcasting system 100 shown in FIG. 1. The video services receiver 200 is designed and configured for providing recorded, buffered, and non-recorded (i.e., "live") content to a user, by way of one or more presentation devices. Accordingly, the video services receiver 200 can be used to receive program content, record program content, and present recorded and non-recorded program content to an appropriate display for viewing by a customer or user. The video services receiver 200 also supports the automatic and intelligent recording feature presented here, wherein a designated video event is automatically buffered or recorded when the video services receiver 200 detects a condition that represents a viewing conflict that might inhibit or prevent the user from viewing some or all of the designated video event. This enhanced feature is described in more detail below.

This illustrated embodiment of the video services receiver 200 generally includes, without limitation: at least one processor 202; at least one memory element 204 having a suitable amount of memory associated therewith; a receiver interface 206; a display interface 208 for the display; an audio interface 210; a recording module 212; and a remote control transceiver 214. These components and elements may be coupled together as needed for purposes of interaction and communication using, for example, an appropriate interconnect arrangement or architecture 216. It should be appreciated that the video services receiver 200 represents a "full featured" embodiment that supports various features described herein. In practice, an implementation of the video services receiver 200 need not support all of the enhanced features described here and, therefore, one or more of the elements depicted in FIG. 2 may be omitted from a practical embodiment. Moreover, a practical implementation of the video services receiver 200 will include additional elements and features that support conventional functions and operations.

The processor 202 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as a microprocessor, a controller, a microcontroller, or a state machine. Moreover, the processor 202 may be implemented as a combination of computing devices, e.g., a combination of a digital signal processor and a microprocessor, a plurality of microprocessors, one or more microprocessors in conjunction with a digital signal processor core, or any other such configuration.

The memory elements 204 may be realized using any number of data storage devices, components, or modules, as appropriate to the embodiment. Moreover, the video services receiver 200 could include memory elements 204 integrated therein and/or memory elements 204 operatively coupled thereto, as appropriate to the particular embodiment. In practice, a memory element 204 could be realized as RAM memory, flash memory, EPROM memory, EEPROM memory, registers, a hard disk, a removable disk, or any other form of storage medium known in the art. In certain embodiments, the memory elements 204 include a hard disk, which may also be used to support integrated DVR functions of the video services receiver 200. In this regard, at least one memory element may be considered to be a nonvolatile data storage element. The memory elements 204 may also accommodate volatile data storage. For example, at least one memory element 204 may be configured to serve as a time shift buffer for video content received by the video services receiver 200.

The memory elements 204 can be coupled to the processor 202 such that the processor 202 can read information from, and write information to, the memory elements 204. In the alternative, the memory elements 204 may be integral to the processor 202. As an example, the processor 202 and a memory element 204 may reside in a suitably designed ASIC.

As schematically depicted in FIG. 2, the memory elements 204 can be used to store recorded program events 220 (temporarily such as with a time shift buffer, or in a nonvolatile manner such as with a hard disk) under the control and management of the recording module 212, and to maintain a suitably formatted database (or any appropriate data structure) that indicates a viewing pattern 222 for the user. A recorded program event 220 may be, without limitation: a recorded audio-only program (such as a recorded radio program or a recorded music channel); a recorded video-only or image-only program; a recorded audiovisual program that conveys both audio and video or image content; or the like. In practice, the recorded program events 220 can be formatted, handled, and stored in accordance with well-known and conventional DVR or media buffering techniques and methodologies.

In practice, the video services receiver 200 could generate, maintain, and update any number of viewing patterns for any number of different users. The simple case described here assumes that only one viewing pattern 222 is maintained for a single user of the video services receiver 200. In accordance with certain embodiments, however, the video services receiver 200 maintains a plurality of different viewing patterns corresponding to a plurality of different users. In such an implementation, the video services receiver 200 can utilize an appropriate technology that enables it to determine which user's viewing pattern to utilize. For example, the video services receiver 200 may employ a user login routine to determine the identity of the current user.

The receiver interface 206 is coupled to the customer's satellite antenna, and the receiver interface 206 is suitably configured to receive and perform front end processing on signals transmitted by satellite transponders. In this regard, the receiver interface 206 can receive data associated with any number of services (e.g., video services), including data that is used in connection with the viewing pattern 222, onscreen menus, GUIs, interactive programming interfaces, etc. The receiver interface 206 may leverage conventional design concepts that need not be described in detail here.

The display interface 208 is operatively coupled to one or more display elements (not shown) at the customer site. The display interface 208 represents the hardware, software, firmware, and processing logic that is utilized to render graphics, images, video, and other visual indicia on the customer's display. In this regard, the display interface 208 facilitates the presentation of programs on the display(s) at the customer premises. For example, the display interface 208 is capable of providing graphical interactive programming interfaces for video services, interactive listings of recorded programs, interactive graphical menus, and other GUIs for display to the user. The display interface 208 may leverage conventional design concepts that need not be described in detail here.

The audio interface 210 is coupled to one or more audio system components (not shown) at the customer site. The audio interface 210 represents the hardware, software, firmware, and processing logic that is utilized to generate and provide audio signals associated with the operation of the video services receiver 200. Depending upon the particular embodiment, the audio interface 210 may be tangibly or wirelessly connected to the audio portion of a television or monitor device, or it may be tangibly or wirelessly connected to a sound system component that cooperates with the television or monitor device.

The recording module 212 is operatively coupled to the receiver interface 206 to record program events provided by the incoming services. In practice, the recording module 212 may include, cooperate with, or be realized as hardware, software, and/or firmware that is designed to provide traditional recording and/or buffering features and functions for the video services receiver 200. Accordingly, the recording module 212 may record video programs provided by video services, audio-only programs provided by audio services, or the like. As mentioned above, the recording module 212 cooperates with the memory elements 204 to store the recorded program events 220 as needed.

The remote control transceiver 214 performs wireless communication with one or more compatible remote devices, such as a remote control device, a portable computer, an appropriately equipped mobile telephone, or the like. The remote control transceiver 214 enables the user to remotely control various functions of the video services receiver 200, in accordance with well-known techniques and technologies. In certain embodiments, the remote control transceiver 214 is also used to wirelessly receive requests that are related to the generation, display, control, and/or operation of recorded program listings. For example, the remote control device 113 (see FIG. 1) could be used to initiate a playback command to request playback of a recorded program.

Figure 3:
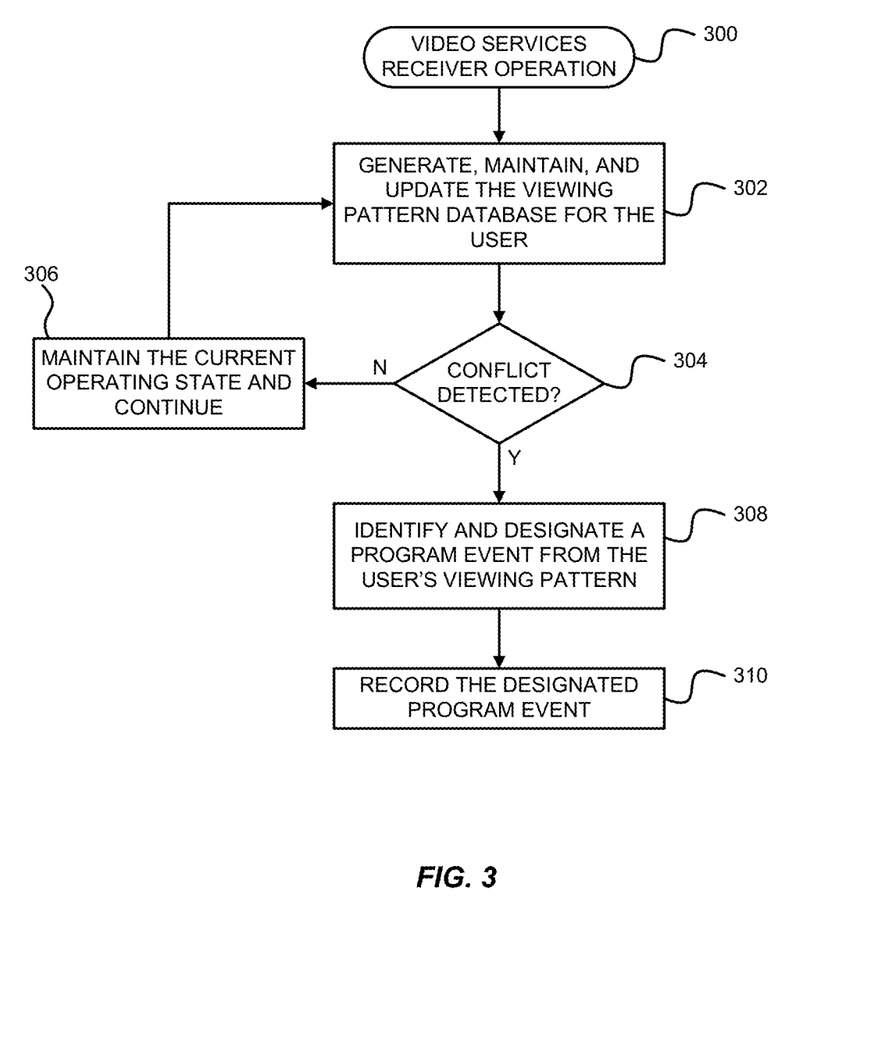
FIG. 3 is a flow chart that illustrates an exemplary embodiment of a method of operating a video services receiver.

The system 100 (FIG. 1) and the video services receiver 200 (FIG. 2) can be used to address situations where a user might be unavailable to watch one of his favorite or regular shows, wherein recording of that particular show has not been scheduled in advance. In this regard, FIG. 3 is a flow chart that illustrates an exemplary embodiment of a process 300 for operating a video services receiver. The various tasks performed in connection with the process 300 (and with the other processes described herein) may be performed by software, hardware, firmware, or any combination thereof. For illustrative purposes, the description of a process may refer to elements mentioned above in connection with FIG. 1 and FIG. 2. Moreover, portions of a process may be performed by different elements of the described system, e.g., a processing module, a software component, or a functional element of a video services receiver. It should be appreciated that a described process may include any number of additional or alternative tasks, the tasks shown in a given figure need not be performed in the illustrated order, and a process presented here may be incorporated into a more comprehensive procedure or process having additional functionality not described in detail herein. Moreover, one or more of the tasks shown in a given figure could be omitted from an embodiment of the illustrated process as long as the intended overall functionality remains intact.

The process 300 generates, maintains, updates, and utilizes a database that includes or otherwise indicates at least one viewing pattern for a user of the video services receiver (task 302). For the sake of simplicity and brevity, this example focuses on the basic scenario where the video services receiver supports only one user having only one maintained viewing pattern. The stored and maintained viewing pattern may be influenced by or derived from one or more of the following, without limitation: the user's actual viewing history; user-identified preferences, likes, or dislikes; the user's actual recording history (e.g., scheduled DVR recordings); the user's on-demand wish list; or the like. In certain embodiments, the user's viewing pattern identifies one or more favorite channels, one or more favorite program events or shows, one or more preferred movie genres, or the like. Although not always required, certain preferred implementations employ smart logic, artificial intelligence, expert system technologies, and/or other methodologies that enable the video services receiver to monitor the user's viewing habits and tendencies and, in response to such monitoring, dynamically update and revise the stored viewing pattern database for the user. Accordingly, task 302 could be performed in the background in an ongoing manner to improve the accuracy of the viewing pattern as time progresses.

In practice, the video services receiver may employ a channel tracking function that keeps statistics related to the user's frequently watched channels, program titles, genres, actors, directors, etc. This allows the process 300 to keep track of user favorites at different time slots, on different days, and the like. In this regard, the process 300 maintains and updates the user's viewing pattern database based on days and time slots (wherein time slots typically correspond to the start times of video program events, e.g., at the top of each hour and in thirty minute increments). A portion of a typical viewing pattern is provided below as Table 1. This example is limited to an evening prime time period. It should be appreciated that the user's viewing pattern may span an entire 24-hour period, and the viewing pattern may include entries for every day of the week.

TABLE 1

User Viewing Pattern (Favorites)

| Time | Sun | Mon | Tue | Wed | Thu | Fri | Sat |
|---|---|---|---|---|---|---|---|
| 7:00 PM | CH 5 | CH 1 | CH 1 | CH 1 | CH 1 | CH 1 | CH 1 |
| 7:30 PM | CH 7 | CH 5 | CH 5 | CH 5 | CH 5 | CH 5 | CH 8 |
| 8:00 PM | CH 24 | CH 9 | CH 19 | CH 79 | CH 91 | CH 56 | CH 63 |
| 8:30 PM | CH 67 | CH 141 | CH 51 | CH 4 | CH 7 | CH 11 | CH 55 |
| 9:00 PM | CH 8 | CH 1 | CH 1 | CH 1 | CH 6 | CH 4 | CH 7 |
| 9:30 PM | CH 8 | CH 3 | CH 3 | CH 3 | CH 2 | CH 2 | CH 5 |

The video services receiver can designate a favorite channel or program event for each time slot, based on the user's historical viewing habits and/or based on user-entered configuration data (such as stated preferences, "seed" values, or the like). Table 1 relates to an embodiment where the viewing pattern simply indicates the time slots (and days) along with the channel number and/or any identifier of the corresponding video service. In other words, the viewing pattern need not monitor and identify the titles of the favorite program events, although that could be implemented as an option. A quick review of Table 1 shows that the user tends to watch Channel 1 at 7:00 PM during the week (perhaps this corresponds to the evening news). Thus, the process 300 can safely assume that Channel 1 is a favorite channel for those time slots. At 8:30 PM, however, the user tends to view different channels on different days. To this end, the viewing pattern database may include any number of time slot entries to accommodate the favorite channels of the user. As mentioned above, the entries may be automatically populated and updated in an intelligent and dynamic manner by the video services receiver. Moreover, one or more of the entries could be created by the user if so desired. For example, the user could access a configuration function that allows her to specify which programs are favorites (at least initially as a seed data point).

The video services receiver can iteratively assign weights to different channels based on the duration a particular channel is watched for a given time interval. Alternatively or additionally, the video services receiver could maintain a simple count to determine which program event or channel is viewed the majority of the time during each time slot of interest. In practice, the process 300 continuously updates the viewing pattern database based on actual viewing habits. Accordingly, the process 300 can dynamically tune the viewing pattern database to make ongoing adjustments as needed.

The video services receiver monitors its current operating state while consulting the viewing pattern database. More specifically, the video services receiver is suitably configured to detect a condition, state, or operating scenario that is inconsistent with the viewing pattern that is maintained for the user. In this regard, the process 300 checks for a condition that conflicts with the start time or presentation time slot of a favorite program event (query task 304). Notably, the process 300 may check for current conflicts and/or for potential conflicts that might arise in the near future (e.g., fifteen or thirty minutes in the future). As explained in more detail below with reference to FIG. 4, one type of conflict relates to a start time conflict, wherein the user is currently viewing a program event that will (or could) overlap with the scheduled starting time of a favorite program event to be provided on a different channel. Another type of conflict (described in more detail below with reference to FIG. 5) relates to a situation where the process 300 determines that the user is not actively watching any programming provided by the video services receiver.

If no conflicting condition is detected (the "No" branch of query task 304), then the process 300 maintains the current operating state and continues as usual (task 306). As depicted in FIG. 3, the task 306 leads back to task 302 such that the video services receiver can monitor the ongoing viewing habits of the user and, in response to the monitoring, automatically update the stored viewing pattern if needed. Thus, the video services receiver can alter the favorite program events for the different time slots in a dynamic and real-time manner If the process 300 detects a condition that is inconsistent with the user's viewing pattern (the "Yes" branch of query task 304), then the process 300 consults the viewing pattern database to identify and designate a program event that corresponds to the conflict (task 308). Notably, task 308 relies on the information contained in the viewing pattern database and, therefore, the process 300 assumes that the user is interested in the designated program event even though she may be watching a different show or may be busy doing something that does not involve the video presentation system. The viewing pattern database is maintained in a manner that makes it easy for the video services receiver to identify which video program event should be flagged as favorite content. In this regard, task 308 can access the viewing pattern database and perform a table lookup with the day and a current (or future) time slot as the two input values to arrive at the desired entry. As shown in Table 1 above, each entry identifies the user's favorite channel for that particular day and time slot.

Thereafter, the process 300 may continue by recording the designated program event (task 310). The recording may involve a temporary time shift buffer and/or a nonvolatile data storage element. Notably, task 310 records the program event to address and resolve the detected conflicting condition. In other words, task 310 automatically records the user's favorite channel or program event to resolve the conflict. Automated recording in this manner gives the user the opportunity to view favorite programming without missing any of the content that would otherwise be missed at or near the beginning of the scheduled time slot.

Figure 4:
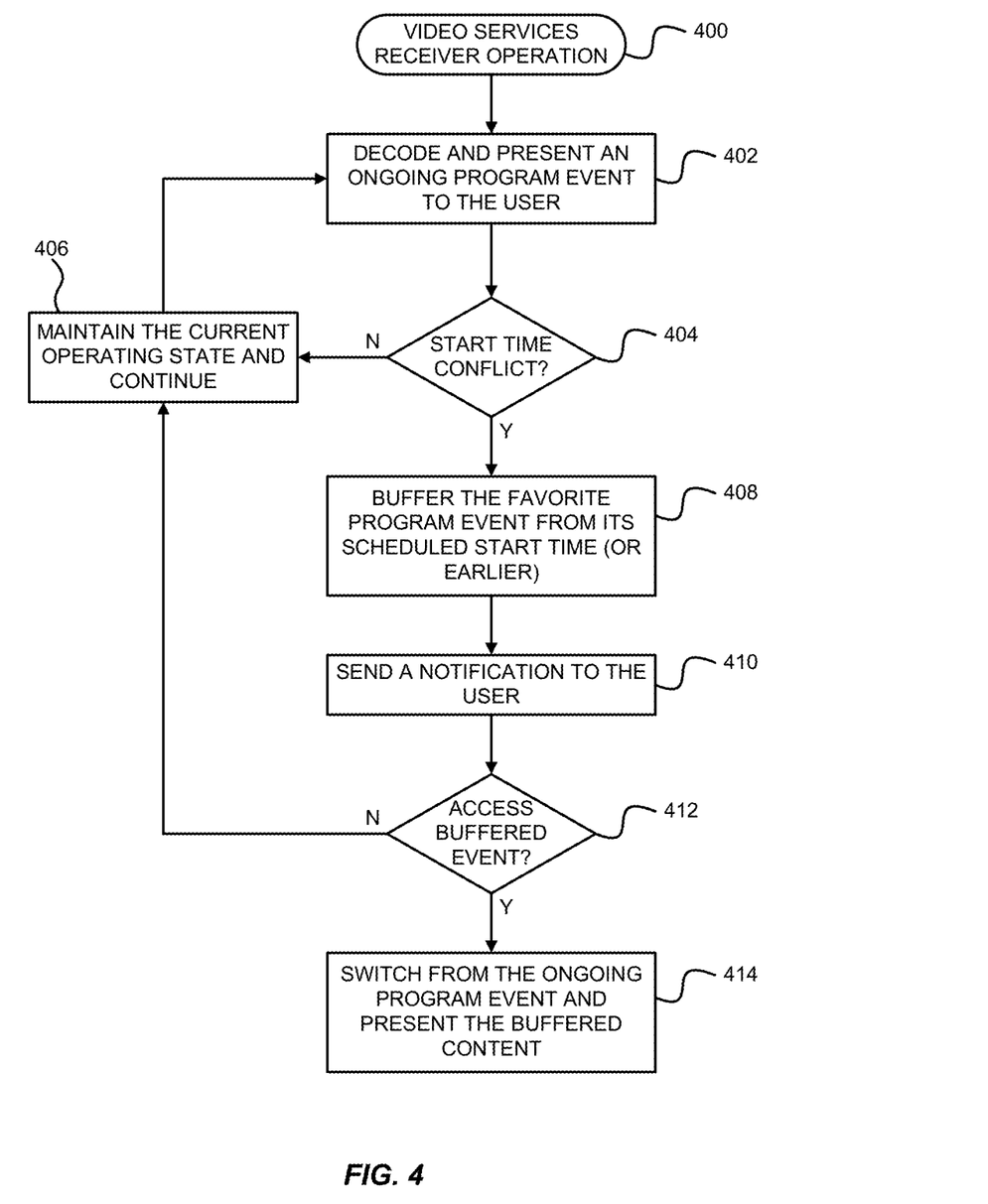
FIG. 4 is a flow chart that illustrates an exemplary embodiment of a method of operating a video services receiver to buffer the beginning of a favorite video program event when the user is viewing a conflicting program.

FIG. 4 is a flow chart that illustrates an exemplary embodiment of a process 400 for operating a video services receiver to buffer the beginning of a favorite video program event when the user is viewing a conflicting program. The process 400 is consistent with the process 300 described above, and it may be considered to be a more detailed version of the process 300. In this regard, common or shared aspects and features of the two processes will not be redundantly described here in the context of the process 300.

The process 400 can be performed when the video services receiver is currently tuned to an ongoing program event. Accordingly, the process 400 decodes and presents the ongoing program event for viewing by the user (task 402). The process 400 may also monitor the state of the video services receiver to detect whether the ongoing program event conflicts with the scheduled start time of a favorite program event that is included in the user's viewing pattern database (query task 404). For example, the process 400 may detect that the video services receiver remains tuned to the ongoing program event (or tuned to the respective channel) after the scheduled start time of a favorite program event. This scenario could arise if the ongoing program event is a live sporting event that has gone into overtime, or if the user has simply forgotten to change the channel. Of course, other programming and scheduling conflicts may arise, and the process 400 can be suitably designed to contemplate other types of conflicts that may need to be addressed.

If the process 400 does not detect a start time conflict (the "No" branch of query task 404), then the process 400 maintains the current operating state and continues as usual (task 406). For example, if the video services receiver is currently tuned to, and is currently decoding, a favorite channel at that particular time, then it can safely assume that no conflict exists. As depicted in FIG. 4, the task 406 leads back to task 402 such that the video services receiver continues decoding and presenting the current program event in a seamless manner. If, however, the process 400 detects an actual or potential start time conflict (the "Yes" branch of query task 404), then the video services receiver is commanded to begin recording at least one designated program event that is included in the viewing pattern for the user. In practice, the process 400 may activate the recording module of the video services receiver such that the favorite program event can be buffered and/or stored in a nonvolatile manner in a hard disk. Thus, in response to the detection of an actual or potential start time conflict, the video services receiver can automatically (and without any user involvement) record the favorite program event at a time that is no later than the scheduled start time of the favorite program event.

If there is only one "overlapping" or conflicting video program event in the user's viewing pattern database, then the process 400 may buffer that favorite program event from its scheduled start time, or earlier if so desired (task 408). Recording at least the beginning of the designated program event may be desirable to address the detected conflict condition and to enable the user to quickly and easily access the beginning of the recorded content. In certain embodiments, the viewing pattern database may be configured to identify more than one favorite program event at a given start time, time slot, or the like. If so, and if the video services receiver has the necessary capabilities and available tuners, then task 408 could buffer more than one favorite channel if needed. Moreover, the video services receiver may be suitably configured to record more than one program event if the start times are staggered. Such a feature would allow the user to continue viewing the ongoing program event while a plurality of favorite program events are automatically recorded for later access.

The determination of a start time conflict may also initiate the generation and sending of an appropriate notification to the user (task 410). The notification may be realized in one or more formats, including, without limitation: an email; a text message; a multimedia message; an automated telephone call or voicemail message; a popup message; an instant message; a mobile device notification; or the like. In certain embodiments, the notification indicates that the designated program event has been (or will be) recorded for the user. The notification may include one or more active controls or options that can be selected or activated by the recipient. For example, the notification may enable the user to select whether or not recording should continue. As another example, the notification may include a control element that allows the user to immediately switch channels to the favorite program event. In some implementations, the notification may enable the user to initiate a place-shifting function such that the favorite program event can be reformatted and delivered to a remote presentation device (such as the user's mobile phone).

The designated program event can be recorded in the background while the user continues to watch the current program event. If the user decides to access the buffered program event (the "Yes" branch of query task 412), then the process 400 controls the video services receiver to switch from the ongoing program event and begin presentation of the buffered content (task 414). Otherwise, query task 412 leads to task 406 to continue presenting the ongoing program event as usual. Depending on the embodiment, task 414 may begin playback at the beginning of the stored content, or it may being playback at the current "live" point in the program event (while allowing the user to choose any time shifted playback point if so desired). In this regard, the notification provided at task 410 may include a graphical control element that gives the user the option to begin playback at the beginning of the recorded content or to merely change the channel to join the designated program event in progress.

Figure 5:
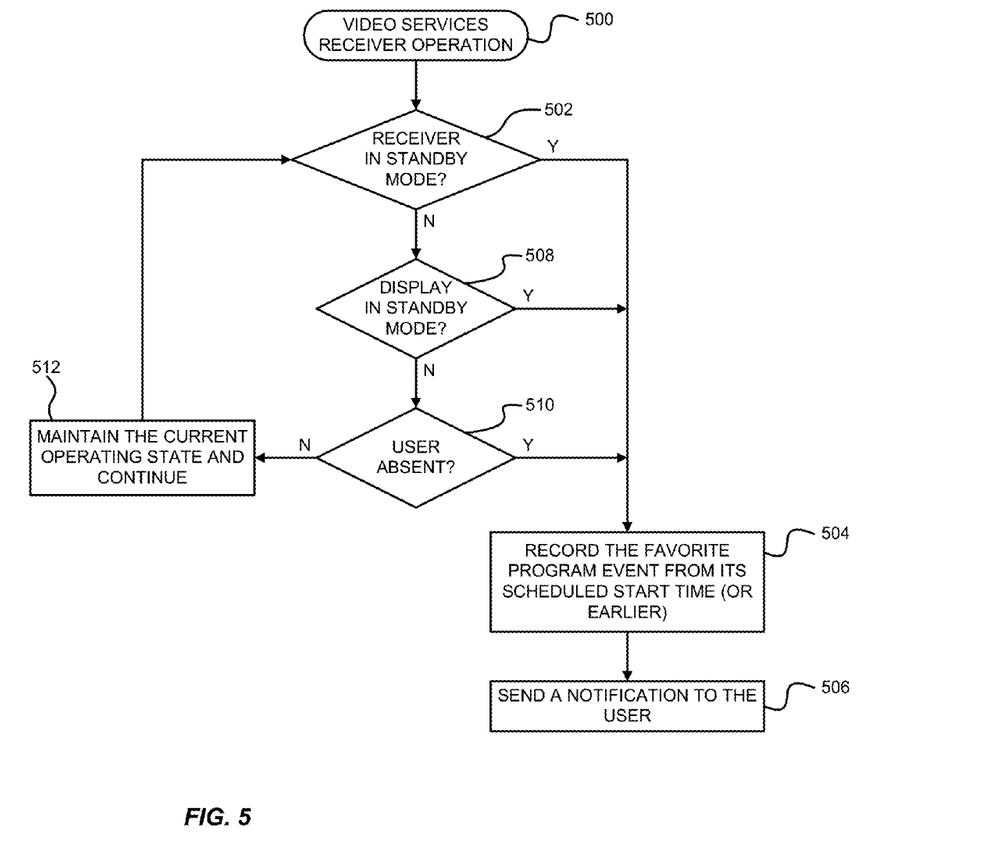
FIG. 5 is a flow chart that illustrates an exemplary embodiment of a method of operating a video services receiver to record a favorite video program event when the user is not viewing any programming.

FIG. 5 is a flow chart that illustrates an exemplary embodiment of a process 500 for operating a video services receiver to record a favorite video program event when the user is not viewing any programming The process 500 is consistent with the process 300 described above, and it may be considered to be a more detailed version of the process 300. In this regard, common or shared aspects and features of the two processes will not be redundantly described here in the context of the process 300.

The process 500 is suitably designed to monitor the operating status of the video services receiver, the operating status of the associated display element, the activity state or physical condition of the user, the status of the surrounding environment, and other conditions (if so desired) that indicate the user is not watching any video program content, is not paying attention, etc. Although any number of triggering conditions could be monitored, this example addresses only three exemplary scenarios: (1) the video services receiver is in a standby mode; (2) the corresponding display element is in a standby mode; and (3) the user is absent or is not actively watching the content being delivered by the video services receiver.

This description assumes that the process 500 has already determined that a potentially conflicting scenario has occurred or will occur in the near future. In other words, the process 500 has identified that the start time of a favorite program event is approaching. Accordingly, if the video services receiver is in a standby mode (the "Yes" branch of query task 502), then the process 500 continues by automatically recording a favorite program event at a time that is no later than the scheduled start time of the event (task 504). Operation in a standby mode allows the video services receiver to perform background routines (such as the process 500) even though no program content is being received, decoded, or presented. Thus, the video services receiver remains powered on during the standby mode, to enable it to perform the various monitoring, detection, and recording processes described herein. For this particular embodiment, the video services receiver utilizes its nonvolatile recording feature to store the program content, thus enabling the user to enjoy the favorite program content at any time thereafter. In addition to the automatic recording of the favorite content, the process 500 may also generate and send a notification to the user (task 506). The notification function of the process 500 is similar to that described above with reference to task 410 of the process 400.

The process 500 may also check if the user's display element is in a standby mode (the "Yes" branch of query task 508). If so, then the process 500 assumes that the user is not currently viewing any programming and, therefore, the process 500 continues to task 504 to automatically record the favorite program event. In practice, the video services receiver could communicate with the display element using any suitable data communication technique or protocol, e.g., a wireless link, via an HDMI cable, or the like. Thus, the video services receiver can monitor the standby and active status of the display element in an ongoing manner.

The process 500 may also utilize one or more sensors to determine whether or not the user is absent, actively viewing, asleep, out of the room, or the like. For example, the process 500 could utilize motion sensors, a camera and facial recognition software, motion sensors, proximity sensors, and/or other devices, instruments, or sensors as needed to formulate a recording trigger decision. In this regard, if the process 500 determines that nobody is in front of the display element, or that the user has fallen asleep, or that the user of interest has left the room and another person is watching the display element, then the video services receiver can take appropriate action. This example assumes that the video services receiver has the capability to determine whether or not the user of interest is present or absent. If the process 500 determines that the user is absent (the "Yes" branch of query task 510), then the process 500 assumes that the user is not currently viewing any programming and, therefore, the process 500 continues to task 504 to automatically record the favorite program event in the manner described above.

As mentioned above, the process 500 could be designed to check for any number of conflicting conditions that might call for the automatic recording of one or more video program events for the user. Although three specific scenarios have been presented here, it should be understood that additional conditions, criteria, and operating states could serve as additional or alternative recording triggers within the context of this automated system.

If the process 500 fails to detect any conflicting conditions that trigger recording of favorite content (the "No" branch of query task 510), the process 500 maintains the current operating state and continues as usual without recording any program content (task 512). As depicted in FIG. 5, the task 512 leads back to task 502 such that the video services receiver continues to monitor for the various recording triggers mentioned above.

The techniques and methodologies presented here allow a video services receiver to monitor and update a user's favorite channels or programs and automatically record favorite channels/programs as needed (without any user involvement and without any pre-scheduled recording instructions. The video services receiver checks for viewing conflicts that might call for the automatic recording of a favorite program event. In accordance with one methodology, the receiver detects when an ongoing program event continues beyond the start time of a favorite program event and responds by automatically recording the favorite program event. In accordance with another methodology, the receiver determines that the user of interest is not viewing any content provided by the video services system and responds by automatically recording a favorite program event from the beginning of that event.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a video services receiver having an associated display element configured to display content provided by the video services receiver, the method comprising:

maintaining, at the video services receiver, a database that indicates a favorite program event having a scheduled start time;

detecting that the video services receiver is currently in a receiver standby mode, that the display element is currently in a display standby mode, or that the video services receiver is currently in the receiver standby mode and the display element is currently in the display standby mode;

in response to the detecting, automatically recording the favorite program event at a time that is no later than the scheduled start time of the favorite program event; and in response to the detecting, sending a notification to the user, wherein the notification indicates that the favorite program event has been or will be recorded, and the notification comprises a control element that enables the user to initiate a place-shifting function such that the favorite program event is reformatted and delivered to a remote presentation device as place-shifted content, the video services receiver serving as the source of the place-shifted content.

2. The method of claim 1, further comprising:

monitoring, at the video services receiver, ongoing viewing habits of the user;

designating favorite program events for the user, based on the monitored ongoing viewing habits; and automatically updating the database with the designated favorite program events.

3. A video services receiver for providing recorded and non-recorded content to a user, the video services receiver comprising:

a receiver interface to receive data associated with video services;

at least one data storage element coupled to the receiver interface and configured to store recorded content including recorded program events provided by the video services;

a display interface for a display operatively coupled to the video services receiver, the display interface facilitating presentation of recorded and non-recorded program events on the display; and a processor coupled to the receiver interface, the at least one data storage element, and the display interface, wherein the processor: maintains a database that indicates a favorite program event having a scheduled start time; detects that the video services receiver is currently in a receiver standby mode, that the display is currently in a display standby mode, or that the video services receiver is currently in the receiver standby mode and the display is currently in the display standby mode; in response to the detecting, automatically records the favorite program event at a time that is no later than the scheduled start time of the favorite program event; and, in response to the detecting, sends a notification to the user, wherein the notification indicates that the favorite program event has been or will be recorded, and the notification comprises a control element that enables the user to initiate a place-shifting function such that the favorite program event is reformatted and delivered to a remote presentation device as place-shifted content, the video services receiver serving as the source of the place-shifted content.

4. The video services receiver of claim 3, wherein the processor:

monitors, at the video services receiver, ongoing viewing habits of the user; designates favorite program events for the user, based on the monitored ongoing viewing habits; and automatically updates the database with the designated favorite program events.

5. A method of operating a video services receiver having an associated display element configured to display content provided by the video services receiver, the method comprising:

maintaining, at the video services receiver, a database that indicates a favorite program event for a user, the favorite program event having a scheduled start time;

detecting, with one or more sensors of the video services receiver, that the user is absent; and in response to the detecting, sending a notification to the user at a time that is no later than the scheduled start time of the favorite program event, wherein the notification indicates that the favorite program event has been or will be recorded, and the notification comprises a control element that enables the user to initiate a place-shifting function such that the favorite program event is reformatted and delivered to a remote presentation device as place-shifted content, the video services receiver serving as the source of the place-shifted content.

6. The method of claim 5, further comprising:

monitoring, at the video services receiver, ongoing viewing habits of the user;

designating favorite program events for the user, based on the monitored ongoing viewing habits; and automatically updating the database with the designated favorite program events.

* * * * *